(12) United States Patent
van Nieuwstadt et al.

(10) Patent No.: US 7,886,524 B2
(45) Date of Patent: Feb. 15, 2011

(54) METHOD FOR CONTROLLING AN INTERNAL COMBUSTION ENGINE DURING REGENERATION OF AN EMISSION AFTER-TREATMENT DEVICE

(75) Inventors: Michiel van Nieuwstadt, Ann Arbor, MI (US); Kevin Chen, Canton, MI (US); Kevin Murphy, Troy, MI (US); Ognyan Yanakiev, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1157 days.

(21) Appl. No.: 11/256,858

(22) Filed: Oct. 24, 2005

(65) Prior Publication Data

US 2007/0089401 A1 Apr. 26, 2007

(51) Int. Cl.
*F01N 3/00* (2006.01)

(52) U.S. Cl. .............................. 60/285; 60/284; 60/286; 60/273; 60/301

(58) Field of Classification Search ................ 60/285, 60/286, 274, 278, 299–300, 301
See application file for complete search history.

(56) References Cited

U.S. PATENT DOCUMENTS

| | | | |
|---|---|---|---|
| 5,050,376 A * | 9/1991 | Stiglic et al. .................. 60/274 |
| 5,192,515 A * | 3/1993 | Gardner-Chavis et al. ........................ 423/213.2 |
| 6,178,743 B1 * | 1/2001 | Hirota et al. ................... 60/277 |
| 6,304,815 B1 | 10/2001 | Moraal et al. |
| 6,314,935 B2 * | 11/2001 | Tanaka et al. ................ 123/298 |
| 6,451,187 B1 * | 9/2002 | Suzuki et al. ................ 204/426 |
| 6,640,775 B2 | 11/2003 | Itoyama et al. |
| 6,644,021 B2 * | 11/2003 | Okada et al. ................... 60/286 |
| 6,742,329 B2 | 6/2004 | Miura et al. |
| 2001/0037643 A1 * | 11/2001 | Kubo et al. .................... 60/301 |
| 2002/0184879 A1 * | 12/2002 | Lewis ........................... 60/285 |
| 2003/0200745 A1 | 10/2003 | van Nieuwstadt et al. |
| 2004/0144082 A1 * | 7/2004 | Mianzo et al. ................. 60/285 |
| 2004/0250531 A1 * | 12/2004 | Palma et al. ................... 60/277 |
| 2005/0022503 A1 | 2/2005 | Miura |
| 2005/0022513 A1 * | 2/2005 | Kitahara ....................... 60/285 |
| 2005/0217254 A1 * | 10/2005 | Uchida et al. ................. 60/295 |

* cited by examiner

*Primary Examiner*—Thomas E Denion
*Assistant Examiner*—Jesse Bogue
(74) *Attorney, Agent, or Firm*—Allan J. Lippa; Alleman Hall McCoy Russell & Tuttle LLP (57) ABSTRACT

A method for improving engine control during a regeneration of an exhaust gas after treatment device is described. According to one aspect of the description, engine air amount and engine fuel amount may be adjusted based on data from a previously executed regeneration of an exhaust gas after treatment device.

21 Claims, 5 Drawing Sheets

METHOD FOR CONTROLLING AN INTERNAL COMBUSTION ENGINE DURING REGENERATION OF AN EMISSION AFTER-TREATMENT DEVICE

FIELD

The present description relates to a method for controlling an internal combustion engine during the regeneration of an after treatment device.

BACKGROUND

One method to operate an internal combustion engine during the regeneration of a $NO_x$ trap is presented in Patent Application No. 2005/0022503 A1. In particular, this method presents a way to control the engine when the exhaust gas air-fuel mixture is enriched to promote NOx trap regeneration. In one example, the method adjusts an excess air ratio λ and fuel injection timing during $NO_x$ trap regeneration by controlling fuel injection timing, intake air throttle opening amount, and an opening amount of an exhaust gas recirculation (EGR) valve. In particular, the opening amounts of the intake throttle and the EGR valve are adjusted to enrich the engine air-fuel mixture during the regeneration of the $NO_x$ trap. Further, the method adjusts injection timing based on engine speed and boost pressure (i.e., the difference between atmospheric pressure and the pressure in the intake manifold). However, the method does not measure boost pressure directly because there can be a delay between throttle movement and an actual change in the boost pressure. Rather, the method infers boost pressure from measured throttle opening amount and measured EGR valve opening amount so as to reduce the before-mentioned delay. In addition, the method adjusts injection timing in an attempt to control engine torque fluctuations that can accompany adjusting the cylinder air-fuel mixture as described by the method. Furthermore, the base fuel amount can be adjusted based on λ, EGR, and engine coolant temperature and can be further adjusted in response to the boost pressure and engine speed.

The above-mentioned method can also have several disadvantages. For example, the throttle and EGR valve positions are used to predict boost pressure, but the valve positions may not be indicative of the actual boost pressure because of manufacturing tolerances and/or component degradation. This can increase air-fuel mixture error and may reduce the effectiveness of the after treatment regeneration process. Further, the engine torque control may degrade since engine torque can be related to fuel injection timing and since the method determines injection timing from an inferred boost pressure.

The inventors herein have recognized the above-mentioned disadvantages and have developed a method to control an engine during the regeneration of an exhaust gas after treatment device that offers substantial improvements.

SUMMARY

One embodiment of the present description includes a method to control an internal combustion during regeneration of an exhaust after treatment device, the method comprising: exhausting a combusted air-fuel mixture from at least a cylinder of an internal combustion engine during a first regeneration of an exhaust gas after treatment device; adjusting at least a control parameter in response to said combusted air-fuel mixture; holding said control parameter in memory without using said control parameter to adjust a subsequent air-fuel mixture during said first regeneration of said exhaust gas after treatment device; and using said control parameter to adjust an air-fuel mixture of at least a cylinder during a subsequent regeneration of said exhaust gas after treatment device. This method overcomes at least some of the limitations of the previously mentioned methods.

By using engine exhaust gas information acquired during a recent regeneration of an exhaust after treatment device, it may be possible to improve regeneration efficiency of an exhaust gas after treatment device during a subsequent regeneration process. Specifically, the engine exhaust excess air ratio may be controlled to a desired value with less possibility of variation and torque disturbance, at least during some conditions. For example, if air and fuel control parameter adjustments are allowed to influence the desired excess air amount, and at the same time the measured exhaust excess air amount is influencing the air and fuel control parameters, it may be possible to set the engine torque and/or engine excess air ratio into an oscillating cycle due to system delays. However, by updating control parameters that can influence the exhaust gas excess air amount during a first regeneration cycle, and then waiting to use the updated control parameters until a subsequent regeneration cycle, it may be possible to reduce the possibility of engine torque and engine excess air amount variation. Consequently, the efficiency of regenerating an exhaust gas after treatment device may be improved, even in a system having delays, and regeneration may be less perceptible to the driver.

The present description may provide several advantages. Specifically, the fluctuations in engine torque and/or engine exhaust gas excess air ratio that may be produced during regeneration of an exhaust gas after treatment device may be reduced or avoided since the undesirable interactions between a control action and a control response may be reduced. Further, the method may be influenced less by manufacturing tolerances and/or component degradation since the method can compensate for some variation of the exhaust gas excess air ratio.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
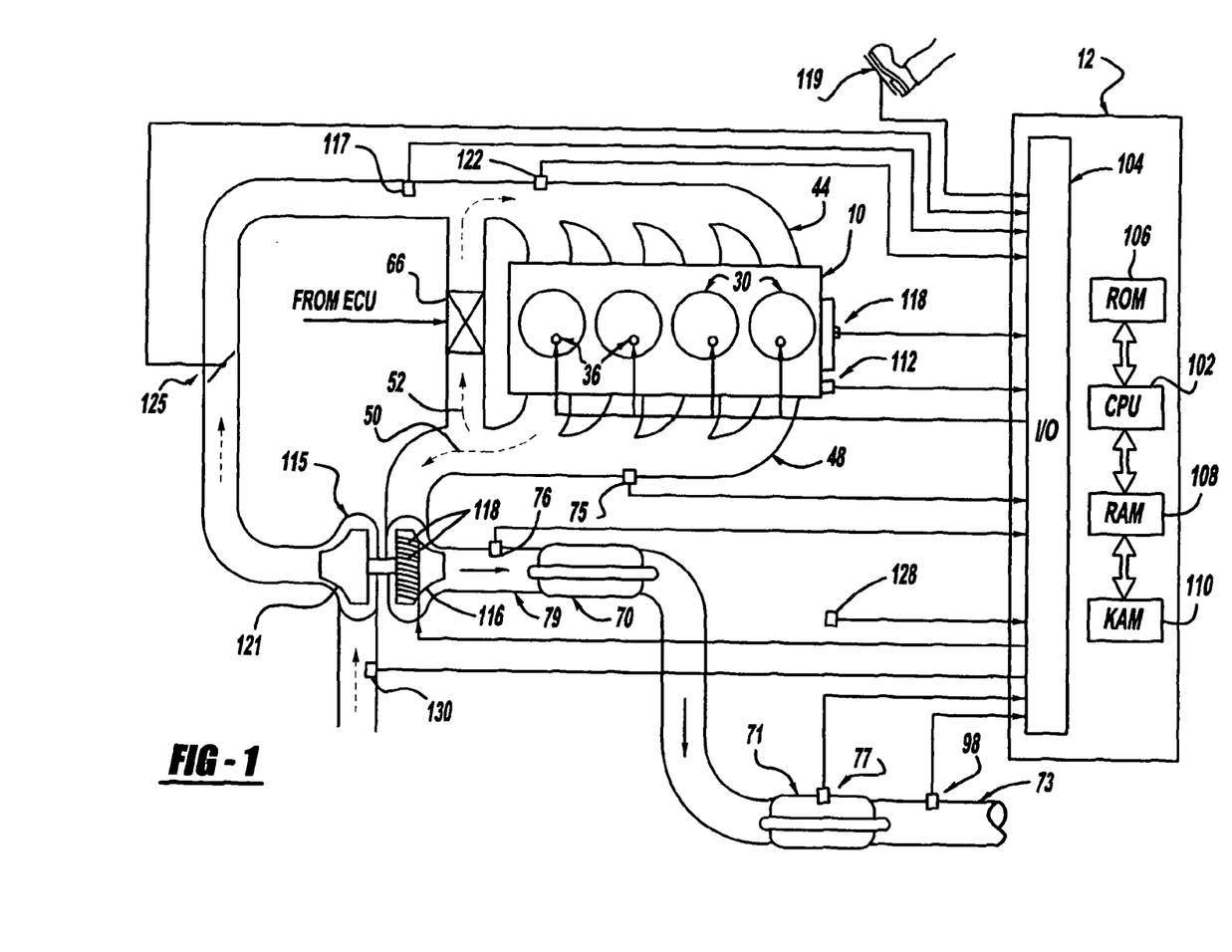
FIG. 1 is a schematic diagram of an engine.

Referring to FIG. 1, internal combustion engine 10, comprising a plurality of cylinders is shown in FIG. 1 and is controlled by electronic engine controller 12. Engine 10 includes cylinders 30 having cylinder walls (not shown) and pistons (not shown) positioned therein and connected to a crankshaft (not shown). Cylinders 30 are known communicating with intake manifold 44 and exhaust manifold 48 via respective intake valves and exhaust valves (not shown).

The fuel is directly injected into cylinders 30 by injectors 36. Fuel is delivered to fuel injectors 36 by fuel system (not shown) including fuel tank, fuel pump, and fuel rail (not shown). Injected fuel is ignited in the cylinder by compression ignition. Alternatively, the engine may be configured with port injection or port and direct injection. Further the engine may be configured with an ignition coil and spark plug to ignite the cylinder air-fuel mixture.

Intake manifold 44 is shown having EGR valve 66 coupled thereto for receiving exhaust gases from exhaust manifold 48. The EGR valve opening amount and the pressure difference across the EGR valve can determine the amount and direction 52 of EGR flowing to the intake manifold. Intake manifold is also shown in communication with turbo charger 115, which is located upstream of electronic throttle 125. Alternatively, throttle 125 may be manually operated by an operator pedal, for example. Turbo charger 115 compresses ambient air using exhaust gas energy that causes turbine 116 to rotate. Exhaust gases can flow in a direction 50 from exhaust manifold 48 toward variable geometry vanes 118 that may be controlled by engine controller 12 to adjust the efficiency of the turbine 116 and compressor 121. Compressed intake air, upstream of turbo charger compressor 121, may also be routed through an inter-cooler to reduce the temperature of the air entering the cylinders so that the inducted cylinder air amount may be increased. In an alternative embodiment, the turbo charger may be of a type that utilizes a waste gate to control the turbine speed.

Universal Exhaust Gas Oxygen (UEGO) sensor 76 is shown coupled to exhaust pipe 79 downstream of turbo charger 115 and upstream of oxidation catalyst 70. Exhaust gases flow from oxidation catalyst 70 to $NO_x$ trap 71. Alternatively, the oxidation catalyst may be removed so that exhaust gases flow directly to $NO_x$ trap 71. Another UEGO 98 is shown coupled to exhaust pipe 73 downstream of $NO_x$ trap 71. Alternatively, another UEGO may be placed between oxidation catalyst 70 and $NO_x$ trap 71. Further oxygen sensors downstream of turbo charger 115 may be replaced by $NO_x$ sensors. $NO_x$ trap temperature can be measured by temperature sensor 77, and/or estimated based on operating conditions such as engine speed, load, air temperature, engine temperature, and/or airflow, or combinations thereof.

Controller 12 is shown in FIG. 1 as a conventional microcomputer including: microprocessor unit 102, input/output ports 104, and read-only-memory 106, random-access-memory 108, 110 Keep-alive-memory, and a conventional data bus. Controller 12 is shown receiving various signals from sensors coupled to engine 10, in addition to those signals previously discussed, including: engine coolant temperature (ECT) from temperature sensor 112 coupled to water jacket (not shown); a position sensor 119 coupled to a accelerator pedal; a measurement of engine intake manifold pressure (MAP) from pressure sensor 122 coupled to intake manifold 44; a measurement (ACT) of engine air temperature or manifold temperature from temperature sensor 117; a measurement of barometric pressure from pressure sensor 128; a measurement of air flowing into the engine from mass air flow (MAF) sensor 130; a measurement of engine exhaust manifold pressure from sensor 75 coupled to exhaust manifold 48; and an engine position sensor from sensor 118 sensing crankshaft position. Sensor 118 may be a variable reluctance, Hall effect, optical, or magneto-resistive sensor. Alternatively, a camshaft position sensor may also be provided and may be used to determine engine position. In a preferred aspect of the present description, engine position sensor 118 produces a predetermined number of equally spaced pulses every revolution of the crankshaft from which engine speed (RPM) can be determined.

Instructions within controller 12 enable the controller to adjust fuel injection timing, EGR valve position, turbo charger controls, throttle opening amount, and spark timing (for applications having an ignition coil and spark plugs) in response to engine operating conditions such that engine performance and emissions may be controlled.

Figure 2:
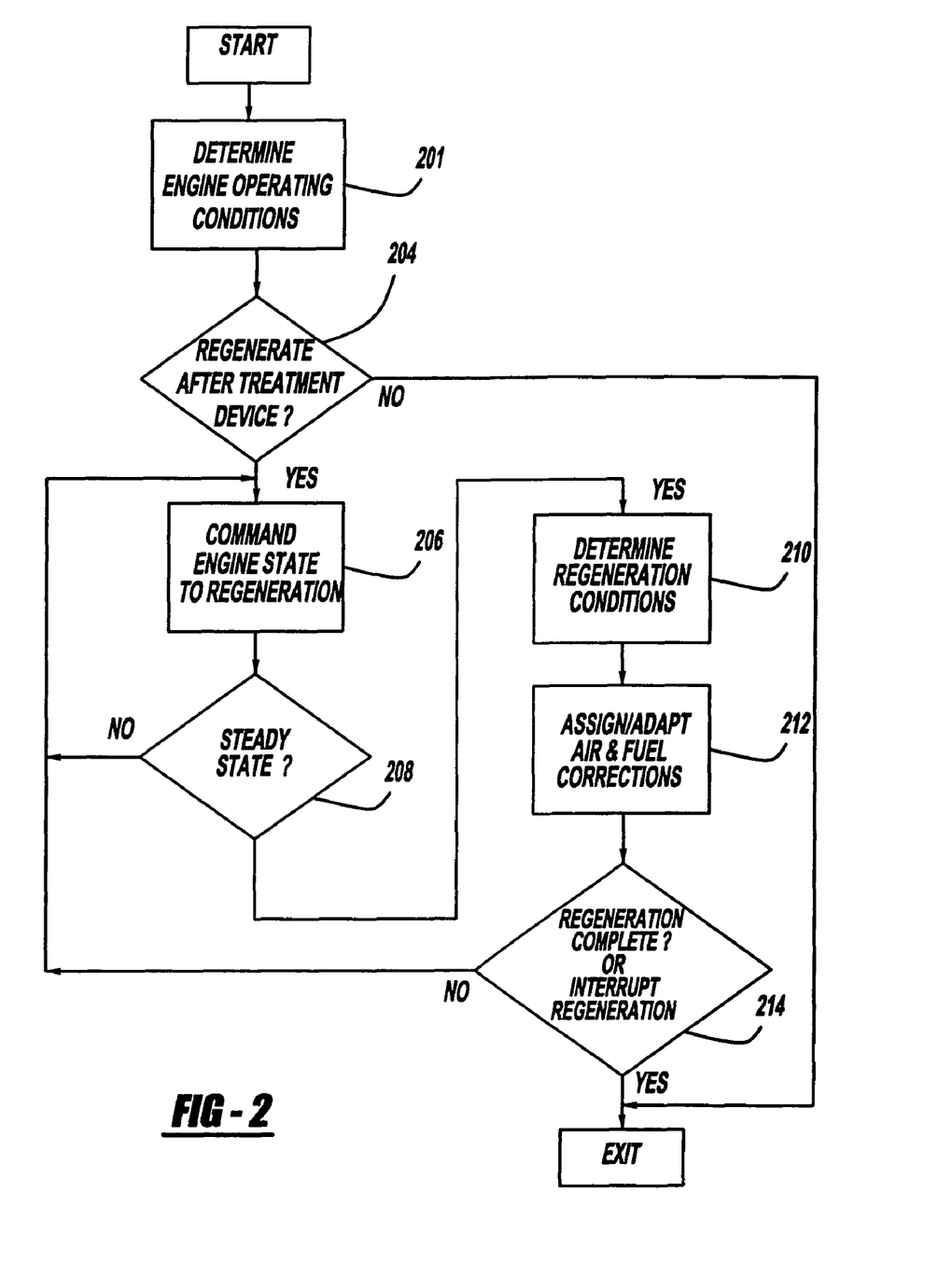
FIG. 2 is a flow chart of an example strategy to control an engine during the regeneration of an exhaust gas after treatment device.

Referring to FIG. 2, a flow chart of an example strategy for controlling an engine during regeneration of an exhaust gas after treatment device is shown. In Step 201, engine operating conditions may be determined by interrogating sensor outputs or by inference. For example, driver demand torque can be determined by sensing pedal position sensor 119. Furthermore, engine speed, cylinder air amount, engine inlet air temperature, engine coolant temperature, boost pressure, feed gas exhaust excess air ratio, post after treatment excess air ratio, post after treatment NOx concentration, engine air mass flow rate, exhaust pressure, and catalyst temperature may be determined or inferred by interrogating respective sensors. The routine proceeds to step 204.

In step 204, a decision is made whether it is desirable to regenerate an exhaust gas after treatment device. In one example, the decision to regenerate may be made based on the amount of stored constituents adsorbed on an exhaust gas after treatment device. By estimating the amount of exhaust constituents (e.g., hydrocarbons (HC), carbon monoxide (CO), oxides of nitrogen ($NO_x$)) entering the after treatment device and the operating conditions of the after treatment device (e.g., temperature), it is possible to use known methods to estimate the amount of constituents adsorbed by the after treatment device. If the amount of adsorbed constituents exceeds a predetermined amount, an amount that may vary based on operating conditions of the engine and/or after treatment device, control logic can request regeneration of the after treatment device by setting the regeneration flag high, see the description of FIG. 6 for example. Further, additional logic may be used to inhibit the execution of the regeneration cycle (e.g., regeneration may be limited to a specific temperature of the engine and/or after treatment device) until conditions are more favorable for regeneration. If regeneration is not requested the routine proceeds to exit, otherwise if regeneration is requested the routine proceeds to step 206.

Note that a request to regenerate the exhaust gas after treatment device may be delayed pending a set of engine and/or after treatment device conditions, a substantially constant (e.g., ±10%) engine speed and load operating condition for example.

The engine can be commanded to a regeneration state in step 206. This may be accomplished by setting the throttle 125, injector timing, EGR valve position, and turbo charger controls to predetermined settings. The predetermined settings may vary with small changes in operator, engine, and/or after treatment device conditions so that regeneration conditions stay within a desired range. In one example, the engine throttle 125, turbo charger vanes 118, fuel timing and amount, and EGR valve 66 opening amount may be positioned in response to engine speed and engine or operator load during regeneration. The throttle opening amount, fuel amount and timing, and EGR opening amount are determined in FIG. 2, step 212, and in FIG. 3, step 305, along with adapted and/or adjusted parameters that may affect their commanded control. However, the updated control parameters used in this step may be determined during a previous regeneration of an after treatment device. That is, in one example, the control parameters being updated in the current regeneration cycle are not be used in the current regeneration cycle but may be used in a subsequent cycle. By delaying the use of the control parameters, for at least one regeneration cycle, the possibility of oscillating or diverging actuator demands may be reduced. For example, the parameters $mf_{reg}$, $mf_{post}$ and Maf_cor (see the description of FIGS. 2 and 3, steps 212 and 305) may be updated in after treatment regeneration cycle k and may be used to control fuel injection and/or throttle opening amount in after treatment regeneration cycle k+1. In this way, the exhaust gas excess air ratio delivered to an exhaust gas after treatment device may be held substantially constant ($\pm 0.1\lambda$), if desired, while also controlling the temperature of exhaust gases that pass through the after treatment device.

Note that engine load may be determined based on cylinder fuel amount or cylinder air amount.

During regeneration, engine torque can be held substantially constant (e.g., ±10%) while reducing the exhaust gas excess air ratio by maintaining the engine fuel amount and by adjusting the engine throttle opening amount and the engine EGR valve opening amount, for example. A transition from standard operating mode to regeneration mode may be accomplished by a step change to throttle and/or EGR commands. However, the throttle and EGR opening amounts may be ramped to a desired position so that a more gradual transition to regeneration mode may be possible. A gradual mode transition may make the transition less perceptible to the operator and may improve combustion stability during the transition (see the description of FIG. 3 for further details of controlling exhaust gas excess air ratio during regeneration of an exhaust gas after treatment device). After setting the engine state to facilitate regeneration the routine proceeds to step 208.

In step 208, the routine determines if engine operating conditions are substantially steady enough (e.g., ±10%) to begin to revise and/or adapt engine control parameters that can influence the regeneration of the exhaust gas after treatment device. In one example, the routine evaluates engine speed and load to determine if engine operating conditions may be steady enough to begin parameter updates. However, steady state evaluation may be based on other operating conditions and/or may include additional operating conditions such as the temperature of the after treatment device, the engine exhaust gas excess air amount, engine coolant temperature, boost pressure, exhaust pressure, and vehicle speed. If the operating conditions are not determined to be at a substantially steady state (e.g., ±10%) the routine returns to step 206. On the other hand, if the operating conditions are determined to be substantially steady state (e.g., ±10%) the routine sets the adapt flag high and proceeds to step 210, see the description of FIG. 6 for example.

Note that it is not necessary for the selected operating conditions to remain precisely at a predetermined value. Rather, the operating condition may be allowed to vary and/or change by a predetermined amount during the regeneration cycle without causing the routine to exit or stop parameter updates. For example, where engine speed and load may be used to evaluate steady state conditions, engine speed may be allowed to vary by ±300 RPM and engine load may vary by ±0.1 (where engine load has a value ranging between 0-1). Alternatively, engine operating conditions such as speed may be allowed to increase or decrease by a specified amount over a specified period of time. However, steady state conditions can be desirable during regeneration because of long system delays that may be present in the cylinder air charge control system.

In step 210, engine operating conditions that may be affected by setting engine controls to promote regeneration, step 206, may be determined and/or evaluated. In particular, the exhaust excess air amount, boost pressure, throttle position, exhaust pressure, EGR amount, cylinder air amount, and engine speed may be determined by evaluating sensor inputs and/or by inference from models. The routine then proceeds to step 212.

In step 212, control parameters that may affect engine operating conditions during regeneration may be updated and/or adapted. The strategy shown in FIG. 3 describes an example of how the base fuel amount ($mf_{base}$), cylinder air amount, and cylinder EGR amount may be determined during regeneration of an exhaust gas after treatment device. These base amounts may be adjusted to compensate for component variation, component degradation, and fuel variation, at least during some conditions. Otherwise, if operating conditions are at desired conditions then updating/adapting of parameters can be inhibited. Further, the adjusted and/or adapted parameters can be stored in memory so that they may be retained during ignition key-off and then retrieved during the next key-on period. In this way, the adapted parameters may be stored in memory so that they may be updated to compensate for longer term system changes (e.g., changes in injector flow rates, changes in NOx trap capacity, and/or changes in throttle or EGR opening amounts with respect to flow rates through the device). In one example, the cylinder fuel amount and cylinder air amount may be corrected by determining the difference between a desired exhaust gas excess air ratio, Lambda ($\lambda$), and an exhaust $\lambda$ that may be measured by UEGO sensor 76. Lambda can be expressed as:

$$Lambda(\lambda) = \frac{AF}{AF_{stoichiometry}}$$

Where AF in the numerator is the air-fuel mass ratio and $AF_{stoichiometry}$ is the stoichiometric air-fuel mass ratio. The exhaust $\lambda$ error can be determined by the following equation:

$$Lambda\_err = Dsd\_Lam - Lam\_act$$

Where Lambda_err is the $\lambda$ exhaust error amount, Dsd_Lam is the desired $\lambda$ amount, and Lam_act is the measured $\lambda$ amount. A portion of the $\lambda$ error may be apportioned to correcting the $\lambda$ error. One way to do this is by the following equation:

$$Lambda\_cor = Ka2 \cdot Lambda\_err$$

Where Lambda_cor is the amount of correction to apply to the system, and Ka2 is a scalar value gain that may be a constant or may vary in response to engine operating conditions such as the magnitude of Lambda_err, for example. Further, the range of Lambda_cor may be positive or negative and may be a fraction or multiple of Lambda_err. The magnitude of Lambda_cor can determine how quickly the $\lambda$ error may be removed from the system. The distribution of the correction may be applied to the desired base cylinder fuel and air amounts. In one example, the air and fuel correction terms can be described by the following equations:

$$\text{Maf\_cor} = \text{Lambda\_cor} \cdot AF_{stoich} \cdot mf_{base} \cdot Ka3$$

and $$mf_{reg} = -(1-Ka3) \cdot \frac{mf_{base}^2 \cdot \text{Lambda\_cor} \cdot AF_{stoich}}{maf}$$

Where Maf_cor is the cylinder air mass correction amount, $AF_{stoich}$ is the stoichiometric air-fuel mass ratio for the engine fuel, $mf_{base}$ is the base mass of fuel injected to the cylinder, $mf_{reg}$ is the cylinder fuel mass correction during after treatment device regeneration, maf is the cylinder air mass, and Ka3 is a gain that may be a function of engine speed and load or other before-mentioned operating conditions such as engine temperature and after treatment device temperature, for example. The Ka3 parameter allows more emphasis to be placed on the fuel adjustment at some engine operating regions while more emphasis may be placed on cylinder air amount adjustments at other operating regions. In addition, $mf_{reg}$ may be divided into a portion of fuel that is combusted and a portion of fuel that is injected post combustion ($mf_{post}$). That is, fuel enrichment for regeneration may be provided in combusted fuel and/or by enriching post combustion products. In one example, the fraction of $mf_{reg}$ going into combusted fuel is based on a predetermined fractional limit of cylinder fuel mass with respect to cylinder air mass. For example, a 17:1 air-fuel ratio limit and 0.94 gm of cylinder air limits combustion fuel to 0.055 gm. If the base fuel amount ($mf_{base}$) plus a fraction of $mf_{reg}$ reaches 0.055 gm the remaining fuel can go into post combustion fuel ($mf_{post}$)

The parameters Maf_cor and $mf_{reg}$ may be a single calculated or determined value or they may be the average of a number of calculated or determined corrections that may be made during the regeneration cycle. For example, the final value of Maf_cor may be determined from the following equation:

$$\text{Maf\_cor} = \sum_{k=1}^{k=n} \text{Maf\_cor}(k)$$

Where n is the total number of calculation iterations during a particular regeneration cycle, and k is a number that represents a specific instance of a total number of iterations. The number of calculation iterations may vary during a regeneration cycle and, if desired, the value of Maf_cor may not be updated unless a specific number of iterations have occurred. This may allow the algorithm to form a well averaged correction. Furthermore, unique values of Maf_cor, $mf_{reg}$, and $mf_{post}$ may be stored at different engine operating points so that the regeneration of the exhaust after treatment device occurs in a desirable manner over a wide range of engine operating conditions. Similar to the method described above, $mf_{reg}$ and $mf_{post}$ may be averaged to smooth the fuel adjustments. Alternatively, a correction profile (i.e., correction terms may be stored at selected time intervals during a regeneration cycle, for example) may be stored in memory and elements of the profile may be updated as the routine proceeds through the profile. However, it may be somewhat difficult to establish the correlation between an air and/or fuel adjustment and the profile element that may need to be adjusted. This can be less of an issue if the profile ends in a substantially constant value (e.g., ±0.1λ). After each iterative update of the control parameters the routine proceeds to step 214.

In step 214, the routine decides whether to continue for another iteration of parameter updates or whether to exit the routine. If the regeneration is not complete and there has not been a request to interrupt the regeneration and/or parameter update then the routine returns to step 206, otherwise the routine exits after storing the latest parameter updates in memory. Regeneration may be terminated when the level of an exhaust gas constituent stored in the after treatment device is determined to be below a predetermined amount. Furthermore, it is also possible to interrupt regeneration when there is a substantial change in driver demand or by a change in engine and/or vehicle operating conditions, for example. Regeneration interruption is allowed because it may be difficult to maintain a desired exhaust excess air ratio and/or engine torque amount without affecting other engine operating conditions, engine emissions for example.

Figure 3:
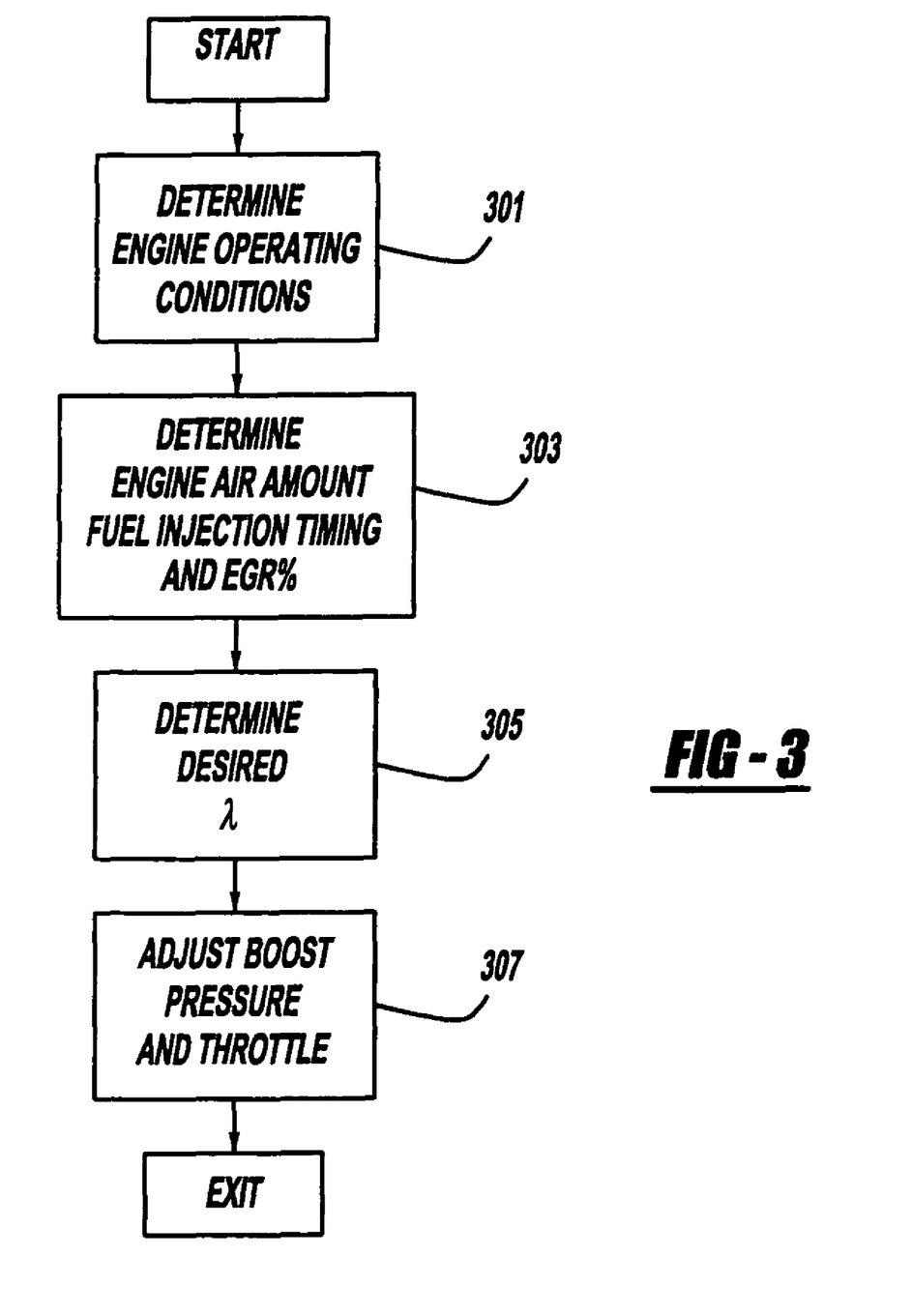
FIG. 3 is a flow chart of an example strategy to control the exhaust gas excess air ratio of an engine during regeneration of an exhaust gas after treatment device.

Referring now to FIG. 3, a flow chart of an example strategy for controlling engine exhaust excess air ratio is shown. In step 301, engine operating conditions can be determined. The engine operating conditions may be determined by evaluating sensor inputs and/or by inferring operating conditions from sensor inputs and modeled behavior or empirical data, for example. The engine operating conditions may include but are not limited to exhaust air-fuel ratio, engine coolant temperature, air charge temperature, exhaust gas temperature, driver demand torque, boost pressure, catalyst temperature, EGR valve position, EGR flow rate, cylinder air charge amount, mass flow of air into the engine, and throttle position. The routine proceeds to step 303.

In step 303, the cylinder fuel amount, injection timing, engine air amount, and the EGR amount can be determined. In one example, the base fuel ($mf_{base}$) amount can be determined by indexing tables or functions having indexing inputs of engine speed and driver demand torque, for example. The resolution of the tables or functions (i.e., number of unique elements of the table) may be varied based on the application so that trade-offs between complexity, access time, performance, and resolution may be achieved. Further, for operating conditions that do not conform to a specific cell in the table, interpolation may be used to determine an output. The percentage of EGR inducted into the cylinder and injection timing can also be determined by using engine speed and driver demand torque to index a similar table or function. In addition, injection timing can be coordinated with the amount of fuel delivered such that the fuel amount may be increased without substantially increasing the engine torque. For example, it may be desirable during some exhaust gas after treatment device regeneration cycles to adjust the base fuel amount, thereby adjusting the exhaust excess air amount. By adjusting the fuel injection timing relative to the engine crankshaft position, it is possible to control the engine torque while adjusting the engine fuel amount. The routine proceeds to step 305.

In step 305, the desired engine excess air ratio can be determined. The desired engine excess air amount is determined in terms of units of λ may include fuel to be combusted and fuel that may be injected post combustion. The desired λ for combustion may be based on engine operating conditions and can be expressed as follows:

$$\lambda exh = \lambda base + \lambda mod + \lambda reg$$

Where $\lambda_{exh}$ is the desired value of exhaust gas excess air ratio, $\lambda_{base}$ is the base in cylinder excess air value determined from engine speed and driver demand torque, and $\lambda_{mod}$ is a modifier term that may be used to enrich or lean the cylinder mixture in response to engine conditions and/or control objectives. For example, when engine temperature is low $\lambda_{mod}$ can be adjusted to enrich the cylinder mixture by reducing the cylinder air amount, for example. In another example, $\lambda_{mod}$ may also vary according to a predetermined profile referenced to a time or number of event after a specific event has occurred (e.g., time since start or number of combustion events since start). An in yet another example, $\lambda_{mod}$ may be determined, at least in part, from feedback information from UEGO sensor 76. However, correcting the in cylinder excess air amount in response to the UEGO measurement can create variation in engine torque and/or may increase soot production. Further, it is also possible to use combinations and/or sub-combinations of the previously mentioned modifiers, or even predetermined sequences, to adjust the $\lambda_{mod}$ term. Thus, the desired amount of excess air for a combustion event ($\lambda_{exh}$) can be varied about an average value or may remain substantially constant (e.g., ±0.1λ) about an average value while the engine is in a normal operational mode or in exhaust gas after treatment regeneration mode. The term $\lambda_{reg}$ is an excess air amount modifier that can be used to adjust the amount of fuel to be combusted for the promotion of exhaust gas after treatment device regeneration during a regeneration cycle. In one example regeneration cycle, $\lambda_{exh}$ may be initially commanded to a first rich value, and then a short period later, to a second rich value that is leaner than the first rich value (see the description of FIG. 5 for example) by adjusting the $\lambda_{reg}$ parameter.

The desired exhaust gas excess air amount for a cylinder event, $\lambda_{exh}$, may be varied by adjusting the throttle opening amount and/or EGR valve opening amount. By adjusting the throttle or EGR amount and leaving the cylinder fuel amount substantially constant, the engine torque may remain substantially constant (i.e., ±10%) while the exhaust gas excess air amount is varied. In addition, the exhaust gas excess air amount may be varied about an average value of λ by adjusting the position of the throttle and/or EGR valve so that the excess air ratio may vary throughout at least a portion of the regeneration period. The excess air ratio can be varied about the average value using known functions such as square waves, sine waves, triangle waves, or by a random distribution. Also, the range of the base fuel amount ($mf_{base}$) may be limited (e.g., $mf_{base}$ may be limited in response to engine or cylinder air amount or by engine temperature) to reduce the possibility of engine misfire and soot production.

In another example, it is possible to adjust the exhaust gas excess air amount while maintaining or reducing engine torque by injecting fuel into the cylinder during the intake or compression stroke. For example, the injection timing may be retarded so that less torque may be produced by the increased fuel amount. The amount of injection retard can be determined from a table or function that may be indexed by fuel amount and engine speed, for example. The table output can then be used to retard the start of injection location with respect to crankshaft position. In addition, it is also possible to inject a portion of the total fuel into the cylinder during the late portion of the expansion stroke or during the exhaust stroke. This can allow the exhaust gas air-fuel ratio to be richened while reducing soot formation in the exhaust gas. Further, by injecting late in the expansion stroke or in the exhaust stroke it is possible to enrich the exhaust air-fuel mixture and limit the engine torque production. The above-mentioned engine excess air ratio equation when modified for post combustion regeneration fuel becomes:

$$\lambda exh = \lambda base + \lambda mod + \lambda reg + post$$

Where the additional term $\lambda_{post}$, is an adjustment based on fuel that is injected during the expansion or exhaust stroke of a cylinder. The total exhaust gas excess air ratio can then be expressed in terms of fuel mass and air mass by the following equation:

$$\lambda_{exh} = \frac{ma}{\frac{mf_{base} + mf_{mod} + mf_{reg} + mf_{post}}{AF_{stoich}}}$$

Where ma is the mass of air entering a cylinder, $mf_{base}$ is the base fuel amount for delivering the desired engine torque, $mf_{mod}$ is a fuel amount modifier for engine operating conditions, $mf_{reg}$ is a fuel modifier for regenerating an exhaust gas after treatment device, $mf_{post}$ is a fuel modifier for post combustion injected fuel that may be used to regenerate and exhaust gas after treatment device, and ma is the mass of air in a cylinder. The routine proceeds to step 307.

In step 307, boost pressure and throttle position may be adjusted. The base boost pressure and base throttle position may be determined by indexing tables that may be similar to those described above. The boost table may be indexed by engine speed and driver demand torque, for example. The boost pressure can be adjusted by altering the position of the vanes on the turbo charger and/or by adjusting the throttle opening amount. Alternatively, the opening amount of a turbo charger waste gate may be adjusted to alter the boost amount for turbo chargers having a waste gate. In one embodiment, the turbo charger vane position and the throttle position may be determined from the tables similar to those describe above.

The mass of air flowing into the engine measured by MAF sensor 130 can be used to modify the position of the throttle so that the desired air flow may enter the engine if the open loop commands (i.e., commands that are determined without feedback) produce a somewhat different flow than may be desired. The desired mass air flow through the engine can be determined from the following equation:

$$MAF_{total} = MAF_{desired} + MAF\_cor$$

Where $MAF_{total}$ is the final corrected desired mass air flow into the engine, $MAF_{desired}$ is the desired mass air flow into the engine, and MAF_cor is a correction term (see the description of step 212) that can be used to adjust the engine air mass flow rate in response to system variation, for example. The final corrected desired mass air flow can be related to a throttle position by using the desired mass air flow and pressure drop across the throttle to determine a throttle position (or throttle opening amount). For example, a table or function can be constructed so that the x-axis represents the pressure difference across the throttle and where the y-axis represents flow through the throttle. By indexing the table using $MAF_{total}$ and the pressure difference between barometric pressure 128 and manifold pressure 122, a desired throttle plate position (i.e., throttle opening amount) can be retrieved from table cells containing empirically determined throttle plate positions. Further, the determined throttle position can be adjusted from the table derived command (i.e., the open loop command) using the following equation:

$$Thp\_sp(k+1) = Thp\_sp(k) + kb1(Thp(k) - Thp\_sp(k))$$

Where Thp is table derived throttle command, Thp_sp is the value the controller outputs to achieve the desired engine mass air flow, and k is the event number. In another embodiment, the throttle position may be adjusted in response to the exhaust UEGO sensor 76. Specifically, an error signal may be produced by subtracting the desired exhaust λ from the exhaust λ observed by sensor 76. Then the error amount may be multiplied by a gain factor to produce an amount of throttle adjustment. The gain factor may be a function of engine operating conditions and/or throttle flow characteristics, for example.

In an alternative embodiment, it is also possible to adjust the EGR valve to compensate for a deviation that may exist between the desired exhaust gas excess air ratio and the excess air ratio observed in exhaust gases. Similar, to the method described above for adjusting throttle position to vary the engine air amount, the engine EGR amount may be adjusted so that the engine air amount is varied. By positioning the intake throttle at a substantially constant position (e.g., ±5°) and varying the EGR amount pressure in the intake manifold may be varied, thereby changing the pressure ratio across the throttle body and flow through the throttle body. The EGR valve position may be determined from look-up tables, similar to those described above, that may be indexed by the EGR mass flow rate and the pressure drop across the EGR valve. Note that the EGR valve position and the throttle position may be moved together so that the desired engine air amount and engine EGR amount may be inducted by the cylinders. In addition, the EGR valve position may be further adjusted by the following equation:

$$EGRp\_sp(k+1) = EGRp\_sp(k) + kc1(EGRp(k) - EGRp\_sp(k))$$

Where EGRp is table derived EGR valve position command, EGRp_sp is the value the controller outputs to achieve the desired engine EGR flow, and k is the event number. The fractions of fresh air and EGR contributing to the pressure in the intake manifold can be determined from Dalton's Law and the ideal gas law. Further, the manifold pressure can be related to cylinder charge by known methods that use the ideal gas law, engine speed, and cylinder volume. Thus, the change in EGR flow rate may be related to a change in manifold pressure and to a corresponding change in the engine air amount which can affect the engine exhaust excess air amount. In this way, the EGR valve position may be used to adjust the exhaust gas excess air amount.

Figure 4:
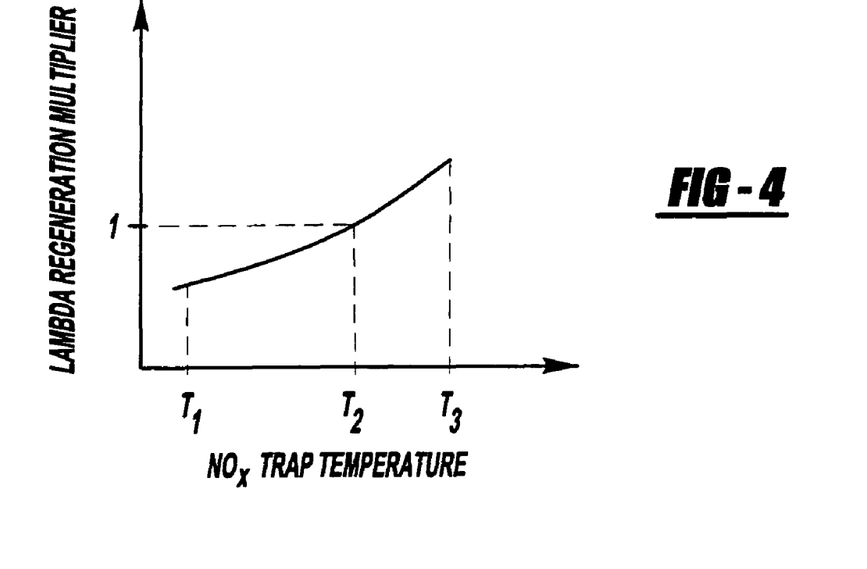
FIG. 4 is a plot of an example excess air amount modifying function that may be used to improve the efficiency of a $NO_x$ trap during a regeneration cycle.

Referring to FIG. 4, a plot is shown that describes the one example relationship between an exhaust excess air ratio multiplier and $NO_x$ trap temperature during $NO_x$ trap regeneration. The x-axis represents a temperature range of a $NO_x$ trap. The y-axis represents an amount that Lambda can be multiplied by in response to the $NO_x$ trap temperature. The trend of curve 401 is to reduce the Lambda multiplier as the $NO_x$ trap temperature increases. By adjusting the exhaust gas excess air ratio as a function of temperature the efficiency of the $NO_x$ trap can be improved. This is example, a Lambda modifier can be multiplied by $\lambda_{base}, \lambda_{mod}, \lambda_{reg}$ or alternatively a similar function may be used to modify engine fueling directly by multiplying the adjustment factor by $mf_{base}, mf_{reg}, mf_{post}$, or $mf_{mod}$.

Figure 5:
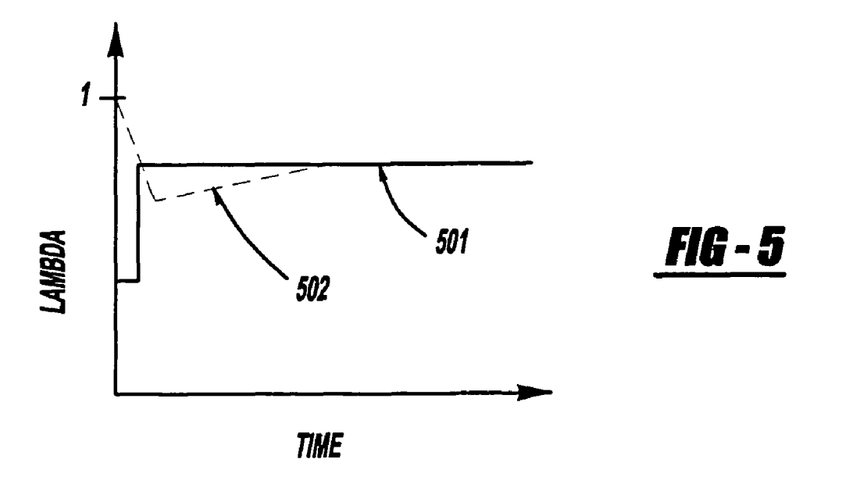
FIG. 5 is a plot of another example excess air amount modifying function that may be used to improve the efficiency of a $NO_x$ trap during a regeneration cycle.

Referring to FIG. 5, a plot is shown that describes several different Lambda multiplier regeneration profiles that may be requested during a $NO_x$ trap purge to influence the exhaust gas excess air ratio. The x-axis represents the time since regeneration of an exhaust gas after treatment device has begun. Alternatively, the x-axis may reference the accumulated mass of the exhaust gas mixture since a regeneration cycle has started. The y-axis represents the Lambda regeneration multiplier which may be used to adjust one or more of the $\lambda_{base}, \lambda_{mod}$, 80 $_{reg}$, and $\lambda_{post}$ terms. This illustration shows that the Lambda multiplier can be adjusted as a function of time since the start of regeneration. Curve 501 illustrates a regeneration profile where Lambda begins low and then increases to a higher level as the cycle advances. This type of profile may improve the conversion efficiency when initially entering a regeneration cycle. Curve 502 shows the Lambda regeneration multiplier beginning at 1 and decreasing to a point, and then increasing from the point as the regeneration cycle advances. These profiles are merely meant as examples and are not intended to limit the scope or breadth of regeneration profiles that are possible. For example, a Lambda profile can also be produced that makes the Lambda regeneration multiplier as a function of the estimated constituents stored on an exhaust gas after treatment device and/or temperature of the exhaust gas after treatment device.

Figure 6:
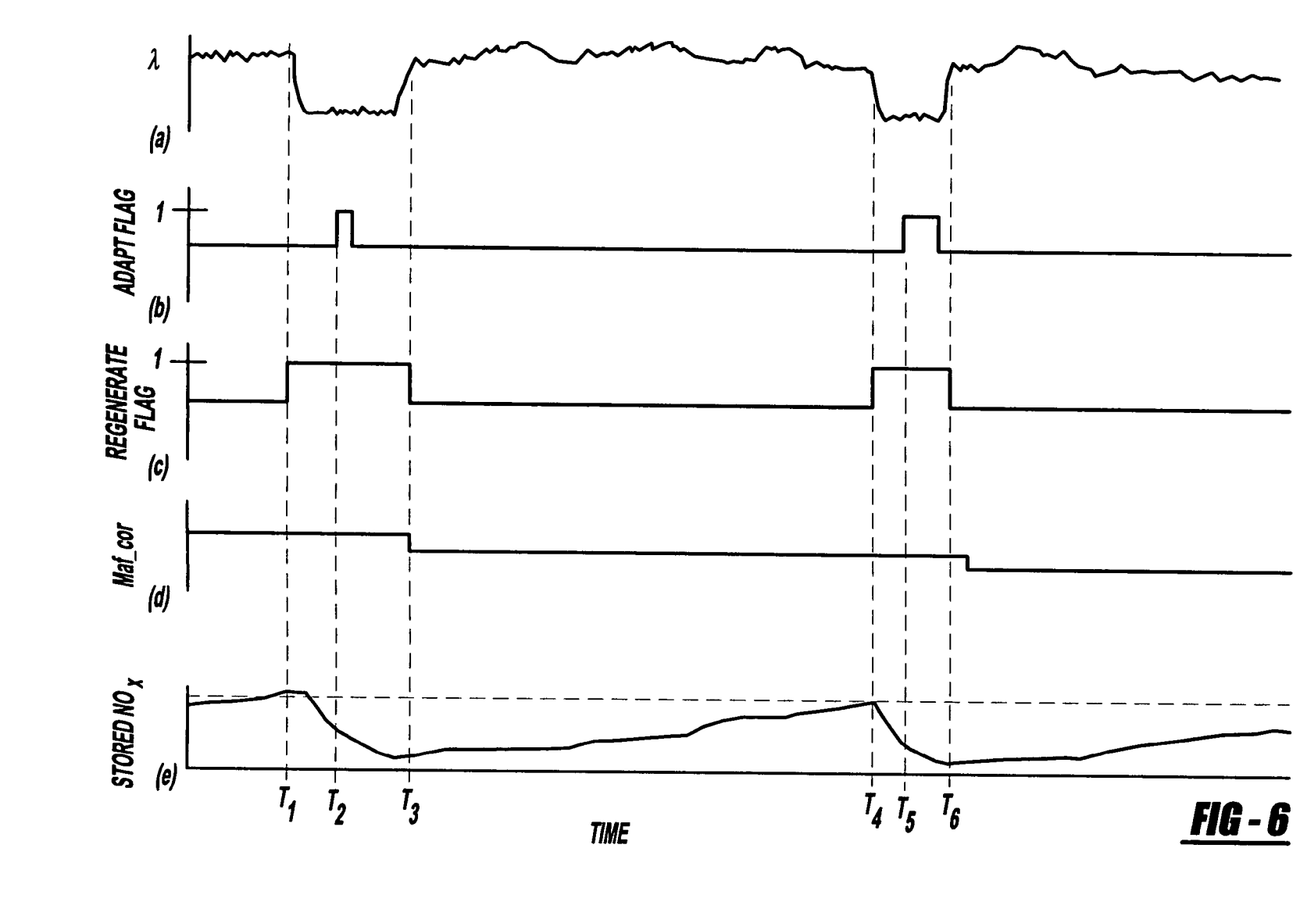
FIG. 6 is an example of events during simulated regeneration control.

Referring to FIG. 6, an example of events during a simulated regeneration of exhaust after treatment devices is shown. Subplot (a) shows an example exhaust gas Lambda during an example vehicle drive. The value of Lambda is reduced between $T_1$ and $T_3$ and between $T_4$ and $T_6$. The regeneration of an exhaust gas after treatment device takes place within these periods. By lowering the Lambda value the amount of hydrocarbons and carbon monoxide increases in the exhaust gas. These constituents act as reductants by which a NOx trap may be regenerated.

Subplot (b) shows the adapt flag set to a high state at location $T_2$ and at location $T_5$. During this period the exhaust Lambda state is enriched and engine operating conditions are substantially constant. The interval for adapting control parameters (e.g., Maf_cor, $mf_{reg}$, $mf_{post}$) at $T_2$ is less than at $T_5$. This is shown to illustrate that the adapt time is not constant but may vary with operating conditions.

Subplot (c) shows the regeneration flag set to a high state at location $T_1$ and at location $T_4$. The regeneration flag may be set high at predetermined intervals or it may be set high in response to a measured or inferred amount of constituents stored on the after treatment device. During the regeneration window the adapt flag may be set high, but it is also possible that the adapt flag may not be set during some other regeneration periods. In one example, if the exhaust gas Lambda is within a specified range of the target value, then the adapt flag remains off and the adapted parameters remain at the present value. The regeneration flag may be set low when the level of a stored exhaust constituent is determined to be below a predetermined value or when regeneration is interrupted by an external event.

Subplot (d) shows one adaptable parameter, namely Maf_cor (i.e., the cylinder air amount correction term), as it is adapted over a period of time. Initially, in the period before $T_1$, Maf_cor is at its highest level. It remains at this level until the regeneration period between $T_1$ and $T_3$ is complete. Then the value of Maf_cor is updated in preparation for the next regeneration cycle. Maf_cor remains constant until the second regeneration cycle ($T_4$–$T_6$) is complete and then it is adjusted again to a new value. This plot illustrates that the control parameters do not need to be updated during the regeneration period. Note that adaptation of Maf_cor may be active only during regeneration of an after treatment device. However, other control parameters may be used to adjust the engine and/or cylinder air amount during periods when regeneration is not active or alternatively the other parameters may be used in conjunction with Maf_cor during regeneration.

Subplot (e) shows the amount of $NO_x$ stored in a $NO_x$ trap during and in between regeneration periods. The stored $NO_x$ increases during periods when regeneration is not active and is then reduced during periods of regeneration.

As will be appreciated by one of ordinary skill in the art, the routines described in FIGS. 2 and 3 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method to control an internal combustion engine, comprising:
   exhausting a combusted air-fuel mixture from at least a cylinder of said engine during a first regeneration cycle of an exhaust gas after-treatment device;
   iteratively determining a correction parameter during said first regeneration cycle;
   during a first subsequent regeneration cycle of said exhaust gas after-treatment device, adjusting a cylinder air amount inducted into said at least a cylinder based on said correction parameter determined during said first regeneration cycle and updating said correction parameter after performing a specified number of calculation iterations; and
   during a second subsequent regeneration cycle of said exhaust gas after-treatment device where less than said number of calculation iterations have occurred, inducting a cylinder air amount corresponding to a previous regeneration cycle of said exhaust gas after-treatment device.

2. The method of claim 1 wherein said exhaust gas after-treatment device is a $NO_x$ trap, and wherein said first subsequent regeneration cycle is different from the first regeneration cycle, and further comprising during the second subsequent regeneration cycle of said exhaust gas after-treatment device where less than said specified number of calculation iterations have occurred, not updating said correction parameter.

3. The method of claim 1 further comprising adjusting fuel timing and fuel amount during the second subsequent regeneration cycle in response to said combusted air-fuel mixture of the first regeneration cycle.

4. The method of claim 1 wherein said combusted air-fuel mixture is an air-fuel mixture that is enriched from a base air-fuel mixture at a particular engine operating condition and wherein a second combusted air-fuel mixture is increasingly leaned as a temperature of said exhaust gas after-treatment device increases during said second subsequent regeneration cycle of said exhaust gas after-treatment device.

5. The method of claim 3 wherein said fuel timing is advanced and said fuel amount is increased without substantially increasing engine torque.

6. The method of claim 1 wherein said cylinder air amount is adjusted by changing a throttle opening area and as a function of constituents stored on said exhaust gas after-treatment device during said second subsequent regeneration cycle of said exhaust gas after-treatment device.

7. The method of claim 1 wherein said cylinder air amount is adjusted by changing an EGR valve opening area.

8. A method to control an internal combustion engine during a regeneration cycle of an exhaust gas after-treatment device, comprising:
   exhausting a combusted air-fuel mixture from at least a cylinder of said internal combustion engine during a first regeneration cycle of the exhaust gas after-treatment device;
   iteratively adjusting a fuel injection timing parameter in response to said combusted air-fuel mixture;
   holding said fuel injection timing parameter in memory and not adjusting a subsequent air-fuel mixture with said fuel injection timing parameter during said first regeneration cycle of said exhaust gas after-treatment device; and
   adjusting an air-fuel mixture of said at least a cylinder during a first subsequent regeneration cycle of said exhaust gas after-treatment device where a specified number of calculation iterations have occurred with said fuel injection timing parameter; and
   during a second subsequent regeneration cycle of said exhaust gas after-treatment device where less than said number of calculation iterations have occurred, inducting a cylinder air amount corresponding to a previous regeneration cycle of said exhaust gas after-treatment device.

9. The method of claim 8 wherein said subsequent air-fuel mixture is an air-fuel mixture that is enriched from a base air-fuel mixture at a particular engine operating condition.

10. The method of claim 8 further comprising limiting execution of the first regeneration cycle of said exhaust gas after-treatment device and the second subsequent regeneration cycle of said exhaust gas after-treatment device to a condition wherein a temperature of said exhaust gas after-treatment device is above a predetermined level.

11. The method of claim 8 wherein said air-fuel mixture is adjusted by changing an opening area of a throttle body.

12. The method of claim 8 wherein said air-fuel mixture is adjusted by changing an opening area of an EGR valve.

13. The method of claim 8 further comprising sensing said exhausted combusted air-fuel mixture upstream of said exhaust gas after-treatment device with a UEGO.

14. The method of claim 13 further comprising meeting a set of predetermined conditions before applying data from said exhausted combusted air-fuel mixture.

15. The method of claim 8 wherein said exhaust gas after-treatment device is a $NO_x$ trap.

16. A method to control an internal combustion engine during a regeneration cycle of an exhaust gas after-treatment device, comprising:
   exhausting a plurality of combusted air-fuel mixtures from at least a cylinder of said internal combustion engine during a first regeneration cycle of the exhaust gas after-treatment device;
   iteratively determining a correction parameter during said first regeneration cycle;
   adjusting fuel timing as well as a cylinder air amount and a cylinder fuel amount that are inducted into said at least a cylinder based on said correction parameter during a first subsequent regeneration cycle of said exhaust gas after-treatment device where a number of calculation iterations have occurred, said air amount adjustment and said fuel amount adjustment made with iteratively determined parameters provided in response to said plurality of combusted air-fuel mixtures exhausted by said at least a cylinder during said first regeneration cycle of said exhaust gas after-treatment device;

increasingly leaning a plurality of subsequent combusted air-fuel mixtures as a temperature of said exhaust gas after-treatment device increases during said first subsequent regeneration cycle of said exhaust gas after-treatment device; and during a second subsequent regeneration cycle of said exhaust gas after-treatment device where less than said number of calculation iterations have occurred, inducting a cylinder air amount corresponding to a previous regeneration cycle of said exhaust gas after-treatment device.

17. The method of claim 16 wherein said exhaust gas after-treatment device is a $NO_x$ trap.

18. The method of claim 16 wherein increasingly leaning said plurality of subsequent combusted air-fuel mixtures includes adjusting the cylinder fuel amount and the cylinder air amount.

19. The method of claim 16 further comprising adjusting the cylinder fuel amount and the cylinder air amount that are inducted into said at least a cylinder during the subsequent regeneration cycle of said exhaust gas after-treatment device based on an amount of $NO_x$ stored by said exhaust gas after-treatment device.

20. The method of claim 16 further comprising adjusting the cylinder fuel amount and the cylinder air amount that are inducted into said at least a cylinder during the second subsequent regeneration cycle of said exhaust gas after-treatment device based on a mass flow rate of exhaust through said exhaust gas after-treatment device.

21. A non-transitory computer readable storage medium having stored data representing instructions executable by a computer to control a regeneration cycle of an exhaust gas after-treatment device coupled to an internal combustion engine of a vehicle, said storage medium comprising:

instructions for exhausting a plurality of combusted air-fuel mixtures from at least a cylinder of the internal combustion engine during a first regeneration cycle of said exhaust gas after-treatment device;

instructions for iteratively determining a correction parameter during said first regeneration cycle of said exhaust gas after-treatment device;

instructions for during a first subsequent regeneration cycle, adjusting an air amount and a fuel amount inducted into said at least a cylinder, said air amount adjustment and said fuel amount adjustment made in response to said iteratively determined correction parameter determined from said plurality of combusted air-fuel mixtures exhausted by said at least a cylinder during said first regeneration cycle of said exhaust gas after-treatment device; and instructions for during a second subsequent regeneration cycle of said exhaust gas after-treatment device where less than a number of calculation iterations have occurred, inducting a cylinder air amount corresponding to a previous regeneration cycle of said exhaust gas after-treatment device.

* * * * *